US00RE49521E

(19) United States
(12) Reissued Patent
Daniels et al.

(10) Patent Number: US RE49,521 E
(45) Date of Reissued Patent: May 9, 2023

(54) HEAT EXCHANGER

(71) Applicant: Aerco International, Inc., Blauvelt, NY (US)

(72) Inventors: Mark Daniels, Valley Cottage, NY (US); Robert J. Battles, Pompton Lakes, NJ (US)

(73) Assignee: Aerco International, Inc., Blauvelt, NY (US)

(21) Appl. No.: 29/794,156

(22) Filed: Jun. 10, 2021

Related U.S. Patent Documents

Reissue of:
(64) Patent No.: Des. 904,590
Issued: Dec. 8, 2020
Appl. No.: 29/722,369
Filed: Jan. 29, 2020

(51) LOC (14) Cl. ..... 23-03
(52) U.S. Cl.
USPC ..... D23/323
(58) Field of Classification Search
USPC ..... D23/317, 318, 319, 320, 323, 329, 330, D23/335, 342
CPC ..... F24H 9/06; F24H 9/2035; F24H 1/125; F24H 1/145; F24H 1/186; F24H 9/124; F24H 9/2078; F24H 9/2007; F24H 1/08; F24H 1/10; F24H 1/12; F24H 1/18; F24H 1/22; F24H 1/50; F24H 1/182
See application file for complete search history.

(56) References Cited

U.S. PATENT DOCUMENTS

D342,125 S * 12/1993 Miller ..... D23/314
D386,561 S * 11/1997 Campbell ..... D23/330
5,881,681 A * 3/1999 Stuart ..... F23D 14/60 122/18.31
7,046,922 B1 * 5/2006 Sturm ..... F24H 9/2028 392/482
D804,623 S * 12/2017 Yamaguchi ..... D23/318
2005/0161086 A1 * 7/2005 Kubik ..... F24D 17/00 137/334
2012/0279929 A1 * 11/2012 Daniels ..... F24D 17/0031 122/13.01
2014/0209281 A1 * 7/2014 Kamps ..... F24V 40/00 165/104.14
2017/0172831 A1 * 6/2017 Sang ..... E03D 9/08

* cited by examiner

*Primary Examiner* — Philip S Hyder
(74) *Attorney, Agent, or Firm* — Harris Beach PLLC

(57) CLAIM

The ornamental design for a heat exchanger, as shown and described.

DESCRIPTION

FIG. 1 is an isometric view of the heat exchanger of our invention;
FIG. 2 is a front view of the invention;
FIG. 3 is a right side view the invention;
FIG. 4 is a left side view of the invention;
FIG. 5 is a rear view of the invention; and,
FIG. 6 is a top view of the invention.
In the drawings, the broken lines depict environmental subject matter only and form no part of the claimed design.

1 Claim, 6 Drawing Sheets

Matter enclosed in heavy brackets [ ] appears in the original patent but forms no part of this reissue; matter printed in italics indicates the additions made by reissue.

AMENDED

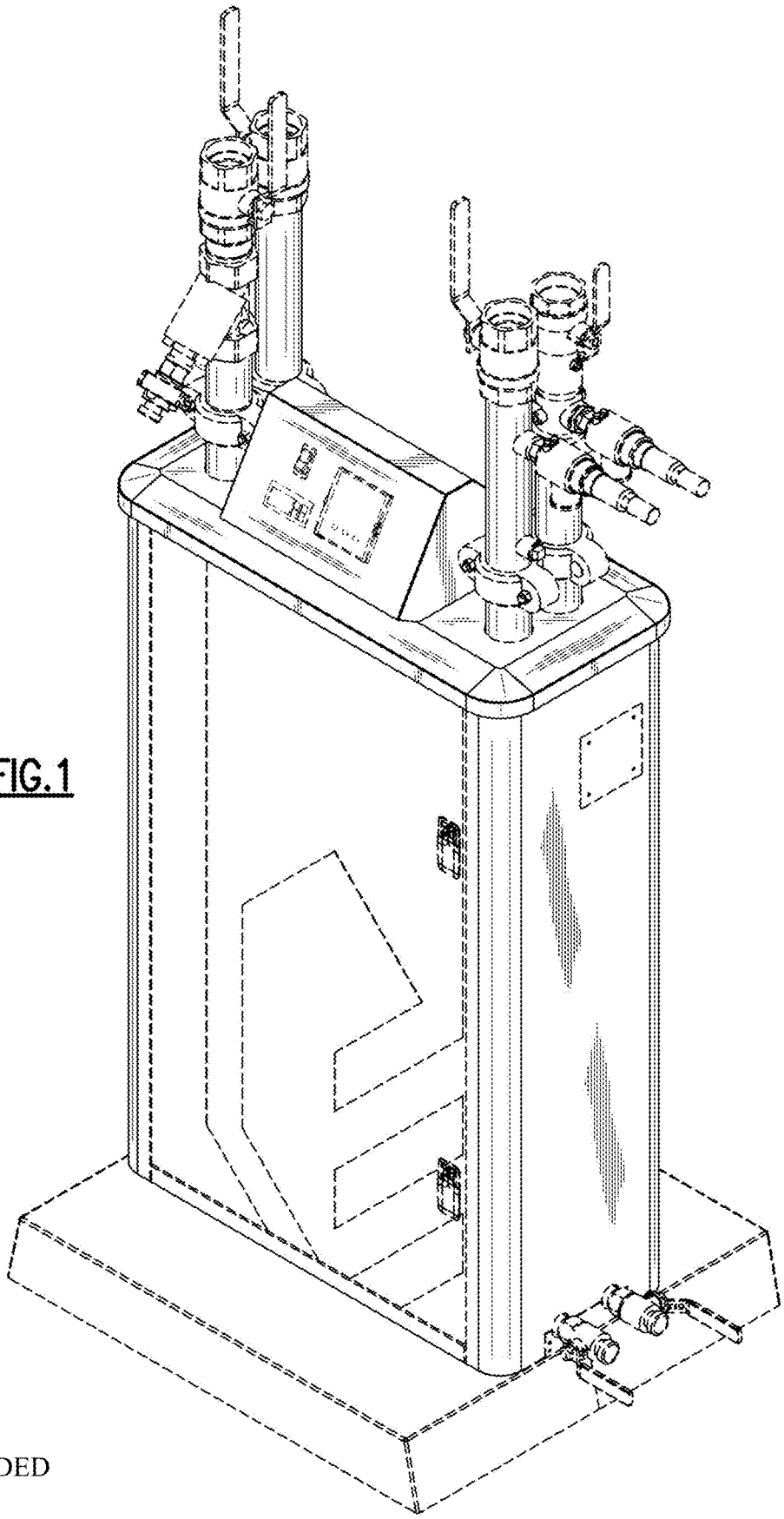
FIG.1
AMENDED

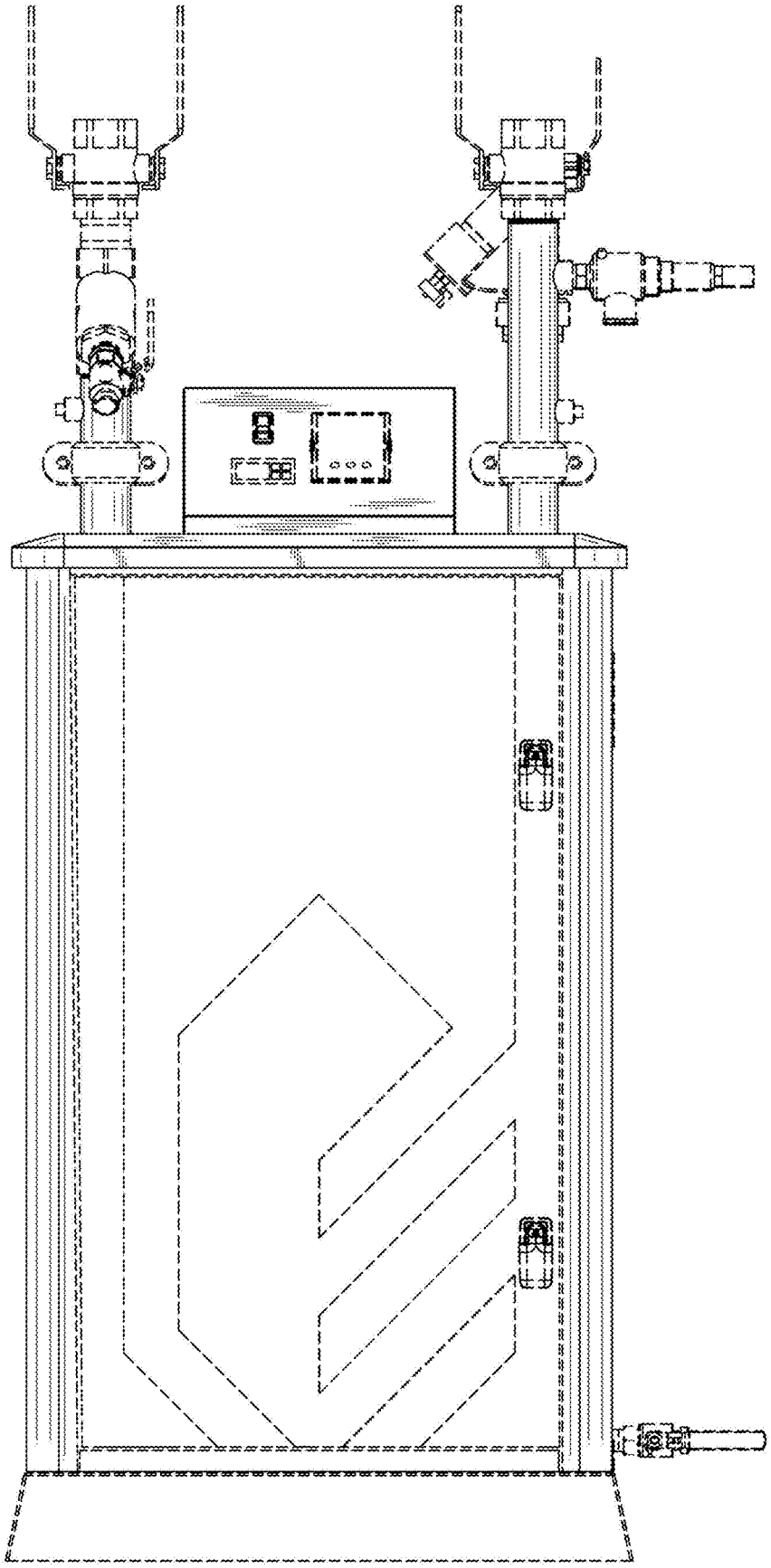
FIG.2
AMENDED

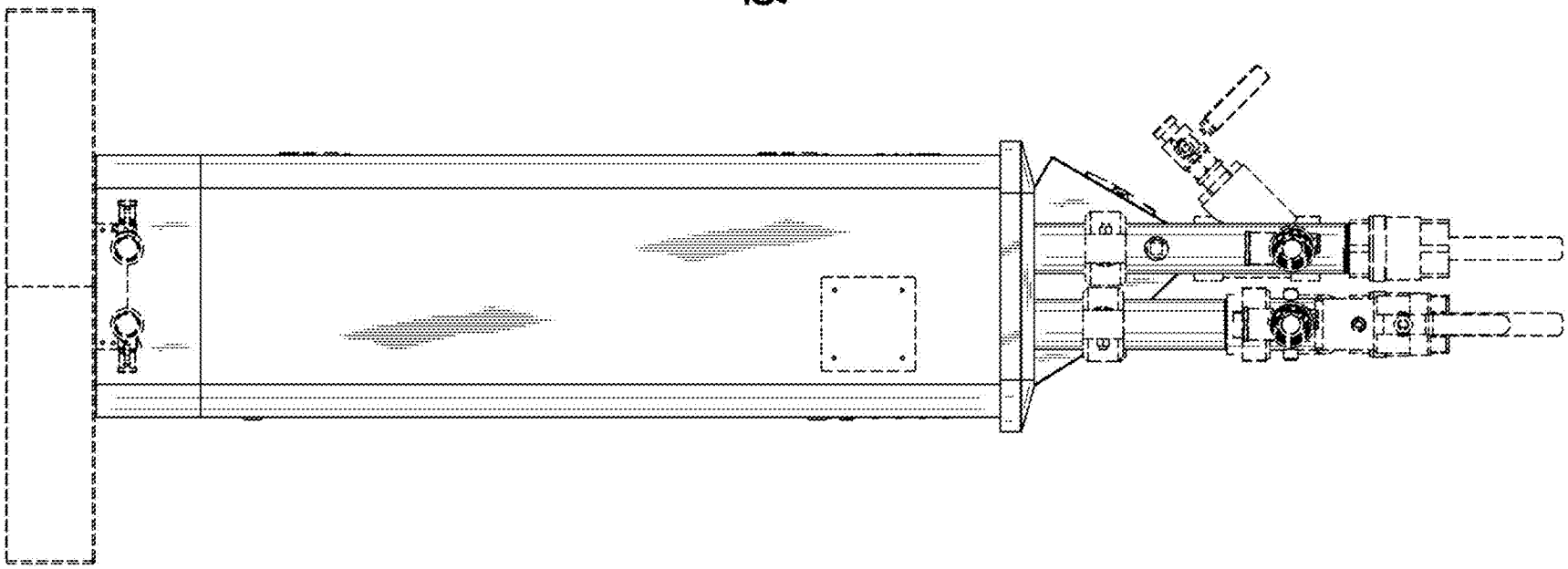
FIG.3
AMENDED

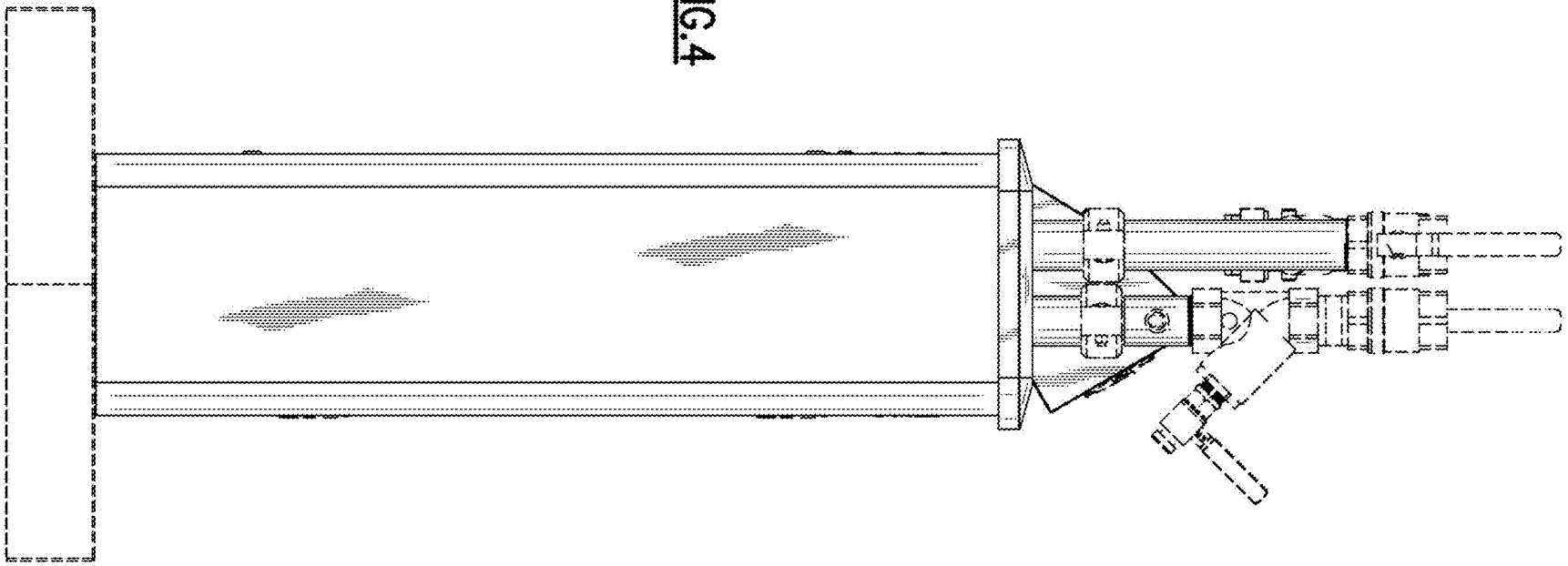
FIG.4
AMENDED

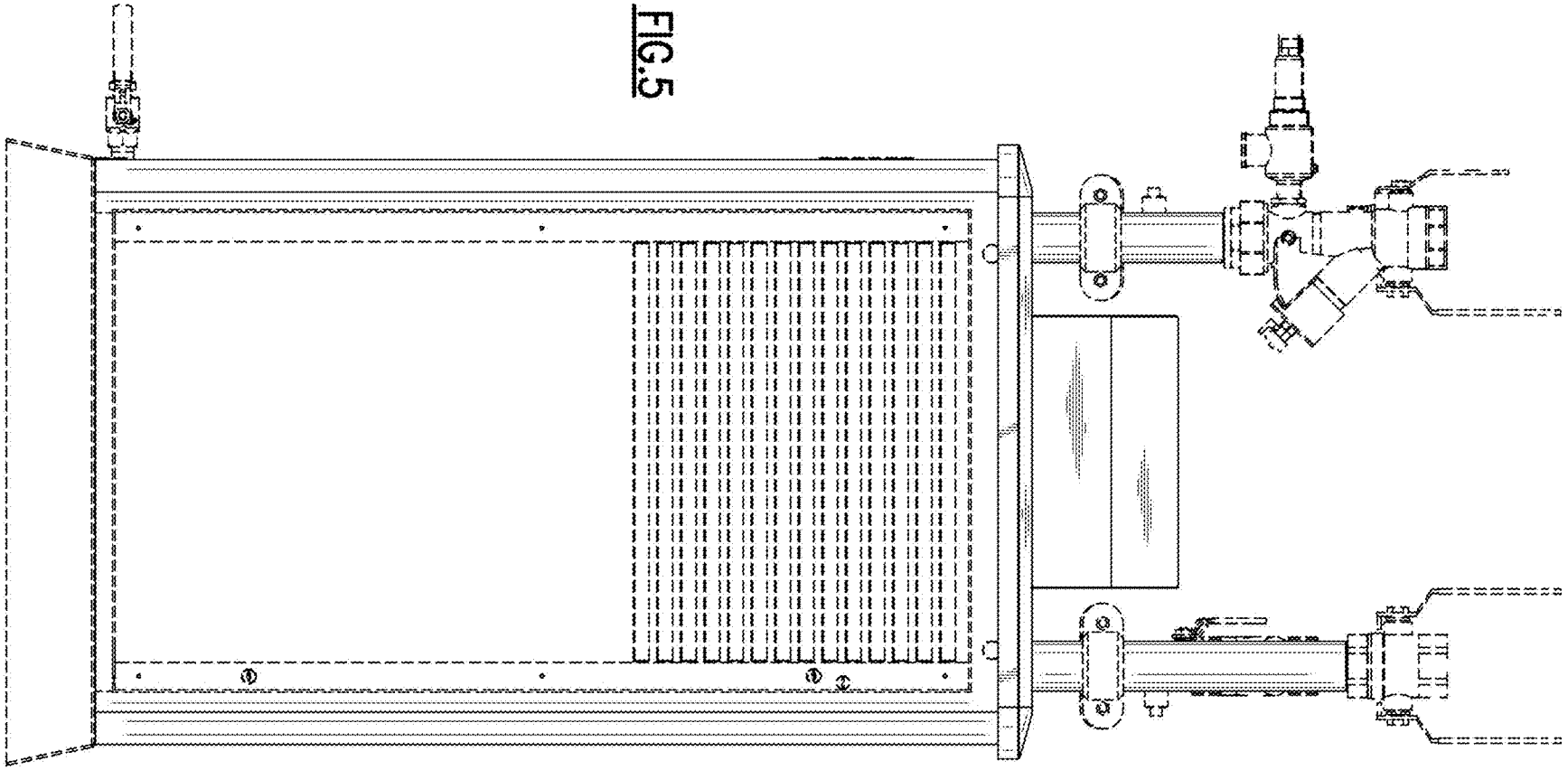
FIG.5
AMENDED

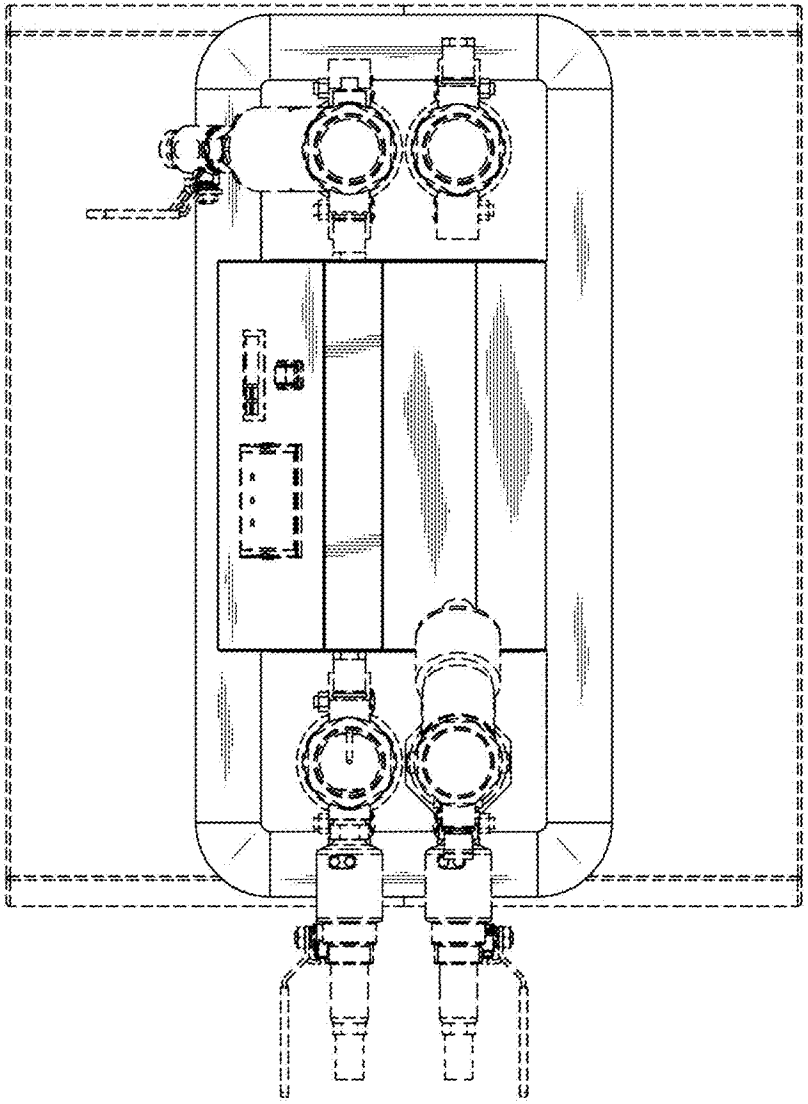
FIG.6
AMENDED